May 30, 1933. P. G. E. GUNKEL 1,911,314
BATTERY BOX HANDLE
Filed Sept. 17, 1931 2 Sheets-Sheet 1
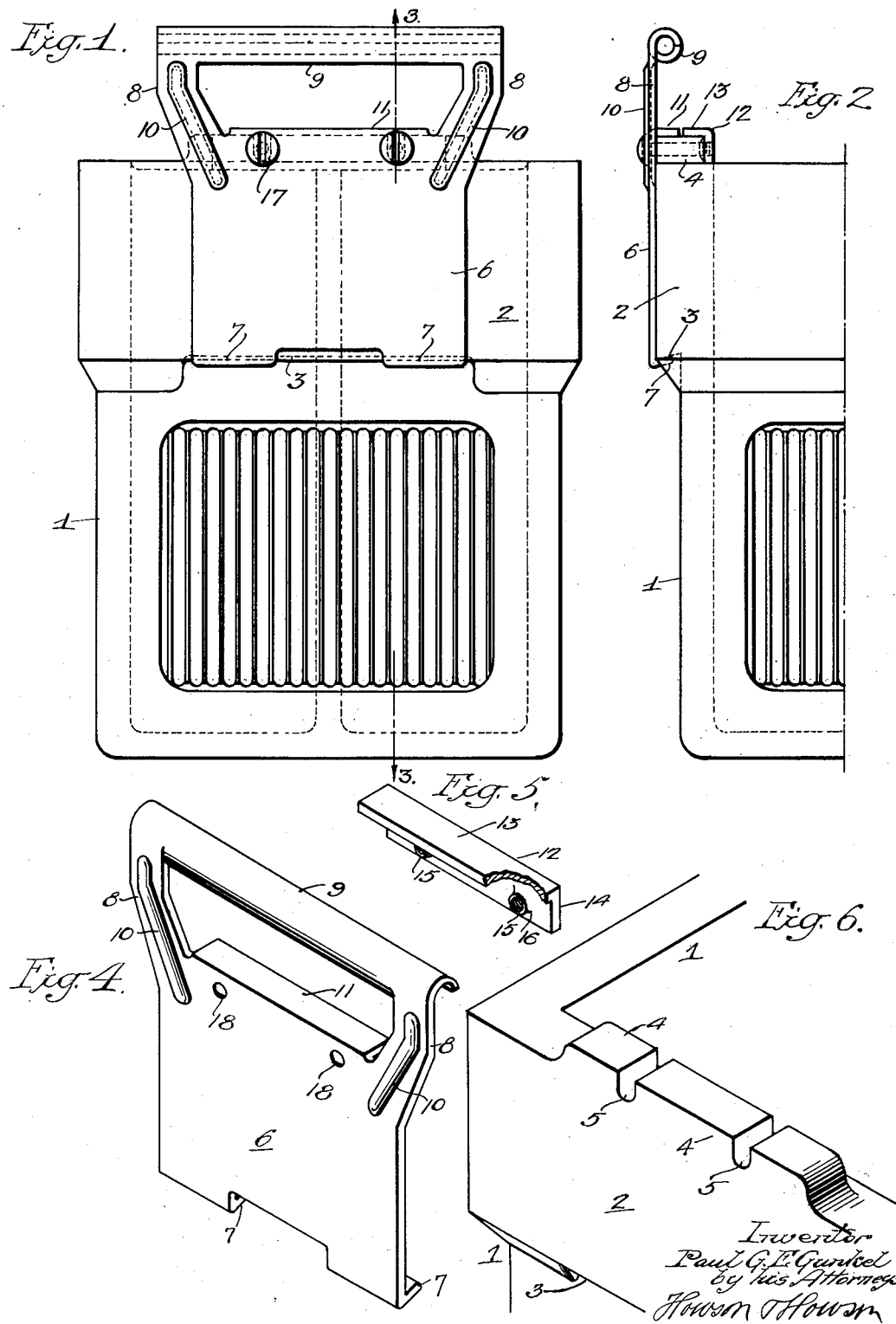

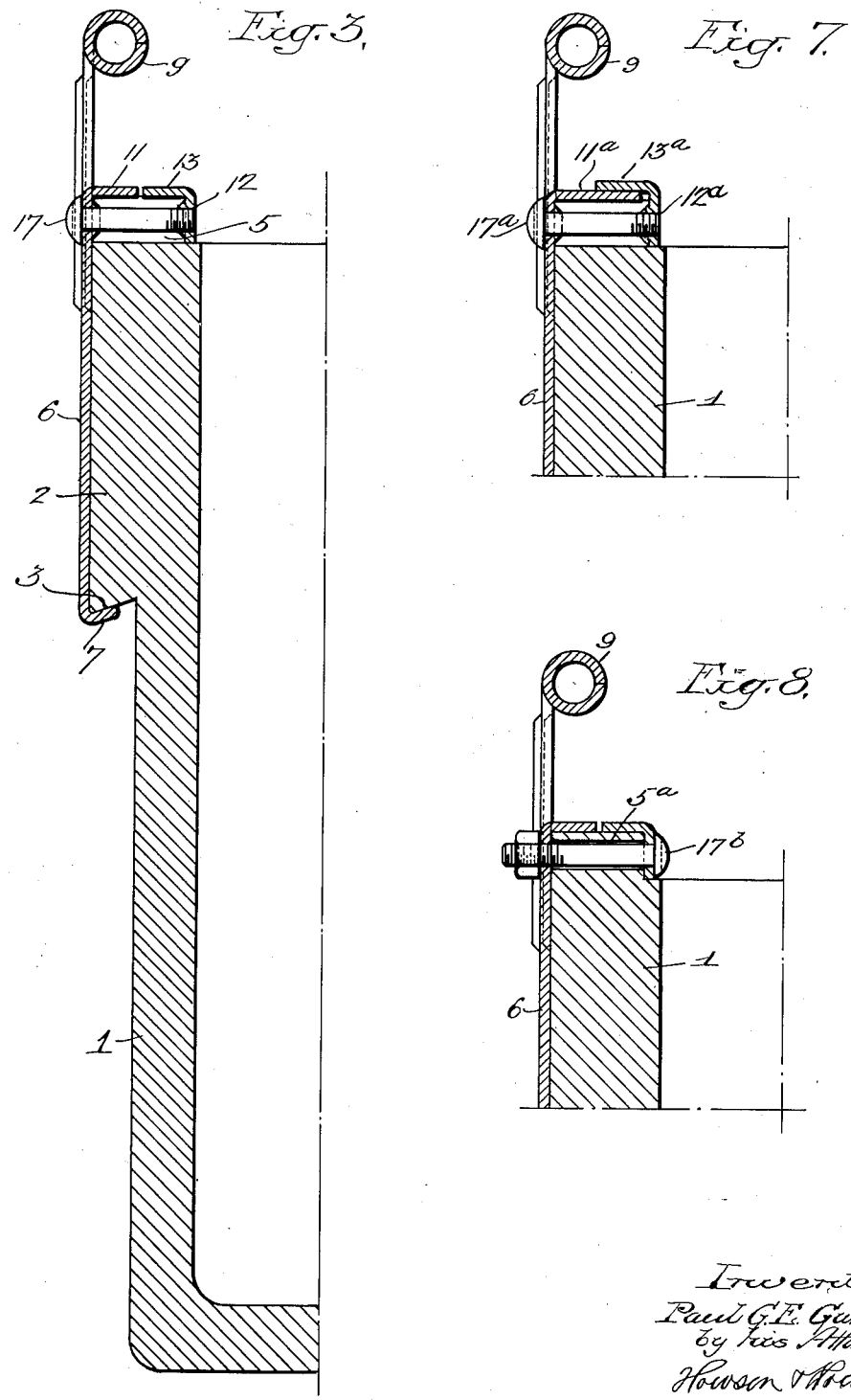

Patented May 30, 1933

1,911,314

UNITED STATES PATENT OFFICE

PAUL G. E. GUNKEL, OF TRENTON, NEW JERSEY, ASSIGNOR TO JOS. STOKES RUBBER CO., OF TRENTON, NEW JERSEY, A CORPORATION OF NEW JERSEY

BATTERY BOX HANDLE

Application filed September 17, 1931. Serial No. 563,444.

My invention relates to certain improvements in the handles for storage battery boxes or containers, which are made of rubber composition or like material.

One object of my invention is to make a simple and strong handle which can be so applied to the battery box that the box can be readily lifted by the handle without straining, chipping or cracking the box.

A further object of the invention is to so attach the handle to the box that it will be firmly attached to the box by retaining screws which clamp the handle firmly to a projection on the box.

A still further object of the invention is to provide a box with a projection at each end having slots through which the clamping screws of the handle are passed, the projection providing means by which the upper portion of the handle is secured to the box while the lower portion of the handle engages an undercut flange formed in the body of the box.

In the accompanying drawings:

Fig. 1 is an end view of a battery box, showing my improved handle secured thereto;

Fig. 2 is a side view partly in section, of one end of the box, showing the handle applied;

Fig. 3 is an enlarged sectional view on the line 3—3, Fig. 1;

Fig. 4 is a detached perspective view of the handle;

Fig. 5 is a detached perspective view of the clamping plate partly broken away;

Fig. 6 is a detached perspective view of a portion of one end of the box, showing the slotted projection; and Figs. 7 and 8 are views of modifications of the invention.

1 is the battery box, whch may be of any type desired, and this box has an enlarged portion 2, and formed in the base of this enlarged portion is an undercut recess 3. Projecting upwardly from each end of the box is an elongated projection 4, in which are two slots 5—5, for securing bolts by which the handle is clamped to the box.

The outer surface of each projection is flush with the outer surface of the enlarged portion 2 of the box, but the inner wall of the projection is offset from the inner wall of the box as shown in Fig. 6, to allow the clamping plate to rest on the top of the box back of the inner wall of the battery box.

6 is the handle, made in the present instance of struck up sheet metal. The handle and the parts connected thereto are preferably coated with a material which is not effected by the acids of the battery. The body portion of the handle has inturned lips 7 at the lower end, preferably spaced apart as shown in Fig. 1, and these lips are turned slightly upward so as to conform with the taper of the upper wall of the recess 3 in the box 1, as shown clearly in Fig. 2.

Extending upwardly from the body of the handle 6 are two arms 8, and connecting these arms is the hand-hold 9. The handle, being made of sheet metal, is pressed to form strengthening ribs 10 for the arms and is bent to form the round hand-hold 9 as shown.

An upper flange 11 is bent inwardly from the body of the handle so that when the handle is in position, as in Figs. 1 and 2, the flange will extend over the projection 4 of the battery box. 12 is an angular clamp plate. The upper horizontal flange 13 of this plate extends part way over the projection 4, while the vertical flange 14 bears against the projection and rests upon the body of the box as shown clearly in Fig. 3.

In the vertical flange 14 of the clamp plate 12 are threaded openings 15, and in order to increase the length of the threads, the plate is thickened at the opening as at 16. 17 are screws which pass freely through holes 18 in the body portion of the handle 6 and through the slots 5 and in the upper portion of the box, and into the threaded openings in the clamping plate 12, the heads of the screws bearing against the body of the handle so that on turning the screws the clamping plate is drawn tightly against the projection 4 and there is sufficient body in this projection to rigidly hold the upper portion of the handle.

The battery box is lifted by a handle at each end of the box and the strain of lifting is taken by the inturned lips of the handle and the body of the box, and these lips are bent upwards to engage the beveled upper wall of the recess 3, so that the box can be raised and lowered through the medium of the handles, without liability of cracking or breaking the box.

The handle is especially designed for comparatively large storage batteries such as are used on trucks and omnibuses, where the batteries are of considerable weight, but it will be understood that the handles can be used on any battery box or casing without departing from the essential features of the invention.

In Fig. 7 I have shown a modification of the invention in which the flange 11a of the body portion extends the full width of the projection 4 of the box, and the horizontal flange 13a of the clamp plate 12a overlaps the flange 11a, and the clamp plate is secured to the handle by bolts 17a in the same manner as shown in Fig. 2.

In Fig. 8 the projection 4 at the upper portion of the box is perforated at 5a, instead of slotted, the perforations being of a size to allow the bolt 17b to freely pass through the perforations without engaging the box, the bolt in this instance having a nut at one end bearing against the clamp.

I claim:

1. The combination of a battery box having a projection at each end extending above the top of the box and less in width than the box, so as to form a shoulder at its inner side, said box having an undercut recess some distance from the upper edge of the box at each end; a handle at each end of the box, each handle having inturned lips bent upwards to conform to the upper wall of the recess and having an inturned flange adjacent its upper end extending over the projection of the box, maintaining the lips in the recess when the handle is placed in position; a hand-hold at the upper end of each handle; a plate on the inner side of the projection resting on the top of the box; and horizontal bolts extending through the projection and securing each handle to the plate, so as to firmly secure the handle to the projection.

2. The combination in a battery box having a slotted elongated projection extending above the top of the box at each end thereof, said projection being less in width than the end of the box and forming a shoulder at its inner side, and having undercut recesses at each end some distance from the upper edge of the box; a struck-up sheet metal handle attached to each end of the box, said handle having inturned lips at the lower end, said lips being turned slightly upwards so as to conform with the wall of the recess in the box, the handle having an inturned flange adjacent its upper end bearing against the top of the projection and maintaining the lips in position, said handle having a hand-hold above the top of the box; an angular clamp plate extending over the projection of the box and resting upon the top of the box, the vertical member of the angle plate having threaded openings; and horizontal screws extending through the slots in the projection and attaching the handle to the angle plate.

PAUL G. E. GUNKEL.